US012186969B2

(12) United States Patent
Jeong et al.

(10) Patent No.: US 12,186,969 B2
(45) Date of Patent: Jan. 7, 2025

(54) TERRACE FOLDING SYSTEM OF SECONDARY BATTERY CELL

(71) Applicant: CLEVER CO., LTD., Chungcheongbuk-do (KR)

(72) Inventors: Jong Hong Jeong, Chungcheongbuk-do (KR); Sang Jin Kim, Daejeon Metropolitan (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 509 days.

(21) Appl. No.: 17/614,043

(22) PCT Filed: Apr. 25, 2021

(86) PCT No.: PCT/KR2021/005212
§ 371 (c)(1),
(2) Date: Nov. 24, 2021

(87) PCT Pub. No.: WO2021/215893
PCT Pub. Date: Oct. 28, 2021

(65) Prior Publication Data
US 2022/0227037 A1    Jul. 21, 2022

(30) Foreign Application Priority Data

Apr. 25, 2020  (KR) .................. 10-2020-0050409

(51) Int. Cl.
*H01M 10/04*     (2006.01)
*B29C 53/04*     (2006.01)
*B29L 31/34*     (2006.01)

(52) U.S. Cl.
CPC ..... *B29C 53/043* (2013.01); *B29L 2031/3468* (2013.01); *H01M 10/0404* (2013.01)

(58) Field of Classification Search
CPC ............ H01M 10/0404; H01M 50/102; B29C 53/043; B29C 53/80
See application file for complete search history.

(56) References Cited

U.S. PATENT DOCUMENTS

| 2015/0045197 A1* | 2/2015 | Sugiyama ................. B31F 1/00 |
| | | 493/407 |
| 2016/0264374 A1* | 9/2016 | Katsumata ............. B65H 31/02 |
| 2021/0280913 A1* | 9/2021 | Jeong ................. H01M 10/0583 |
| 2022/0227037 A1* | 7/2022 | Jeong .................... B29C 53/043 |
| 2022/0320565 A1* | 10/2022 | Jeong ............... H01M 10/0481 |

FOREIGN PATENT DOCUMENTS

| JP | 2005-116329 A | 4/2005 |
| KR | 10-1672402 B1 | 11/2016 |
| KR | 10-1758955 B1 | 7/2017 |
| KR | 10-2017-0109327 A | 9/2017 |
| KR | 10-2061664 B1 | 1/2020 |
| KR | 10-2240008 B1 | 4/2021 |

OTHER PUBLICATIONS

International Search Report from corresponding PCT Application No. PCT/KR2021/005212, dated Aug. 9, 2021.

* cited by examiner

*Primary Examiner* — Minh N Trinh
(74) *Attorney, Agent, or Firm* — Harness, Dickey & Pierce, P.L.C.

(57) ABSTRACT

Disclosed is a terrace folding system of a secondary battery cell, including a transfer unit which transports a secondary battery cell; and a folding unit which is disposed along the transfer unit and is temporally separated from the transfer unit to fold a terrace of the secondary battery cell.

4 Claims, 3 Drawing Sheets

TERRACE FOLDING SYSTEM OF SECONDARY BATTERY CELL

CROSS-REFERENCE TO RELATED APPLICATIONS

This application is a national phase application of PCT Application No. PCT/KR2021/005212, filed on 25 Apr. 2021, which claims the benefit and priority to Korean Patent Application No. 10-2020-0050409, filed on 25 Apr. 2020. The entire disclosures of the applications identified in this paragraph are incorporated herein by references.

TECHNICAL FIELD

The present disclosure relates to a terrace folding system of a secondary battery cell, and more specifically, to a terrace folding system of a secondary battery cell which uses a folding unit which operates temporally separately from a transfer unit which transports a secondary battery cell to reduce a tack time of a terrace folding process and increase a folding process time to improve a folding failure.

BACKGROUND ART

This section provides background information related to the present disclosure which is not necessarily prior art.

For a general terrace folding process of folding a terrace formed on an outer circumference of a secondary battery cell, a folding unit configured by a plurality of folding rollers is used.

As a folding roller having a predetermined angle passes by the terrace along a length direction, a terrace is formed.

In the meantime, during a secondary battery cell manufacturing process including the terrace folding process, the secondary battery cell is transported by a transfer unit operated by a conveyer system.

Accordingly, in the terrace folding process of the related art, the folding process is performed by allowing a terrace of the secondary battery cell which is transported by the transfer unit to pass through a fixed folding unit.

However, in the terrace folding process of the related art, a time taken to transport the secondary battery cell is dependent on a time taken to perform the folding process so that a tact time and a cycle time may be increased.

Further, since the time taken to perform the folding process cannot be shortened, even though a product manufacturing time is increased, the folding failure may not be reduced.

SUMMARY

Technical Problem

An object of the present disclosure is to provide a terrace folding system of a secondary battery cell which may reduce a tact time of a terrace folding process and improve a folding failure by increasing a time taken to perform the folding process.

Technical Solution

This section provides a general summary of the disclosure and is not a comprehensive disclosure of its full scope or all of its features.

In order to solve the above-described problems, an aspect among various aspects of the present disclosure provides a terrace folding system of a secondary battery cell, including: a transfer unit which transports a secondary battery cell; and a folding unit which is disposed along the transfer unit and is temporally separated from the transfer unit to fold a terrace of the secondary battery cell.

In the terrace folding system of a secondary battery cell according to an aspect of the present disclosure, the folding unit may further include: a folding roller which forms the terrace at a specific angle; and a roller moving unit which moves the folding roller to any one direction along a length direction of the terrace.

In the terrace folding system of a secondary battery cell according to an aspect of the present disclosure, the folding unit may further include: a sensing unit which senses whether an operation of the transfer unit ends; and a movement controller which moves the roller moving unit to one direction when the operation of the transfer unit ends.

In the terrace folding system of a secondary battery cell according to an aspect of the present disclosure, when a folding operation of the folding roller to fold the terrace ends, the movement controller may move the roller moving unit to the other direction.

In the terrace folding system of a secondary battery cell according to an aspect of the present disclosure, when the roller moving unit moves to the other direction, the folding roller may be disposed in a terrace folding beginning point of the secondary battery cell.

Advantageous Effects

According to the present disclosure, the folding unit which operates to be temporally separated from a transfer unit which transports the secondary battery cell is used to reduce a terrace folding tact time and cycle time of the secondary battery cell.

According to the present disclosure, a terrace folding quality of the secondary battery cell may be improved.

DETAILED DESCRIPTION

Hereinafter, an exemplary embodiment of implementing a terrace folding system of a secondary battery cell according to the present invention will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conforms to the technical spirit of the present disclosure without being limited to a dictionary meaning when recognizing the intrinsic technical spirit of the present disclosure.

Figure 1:
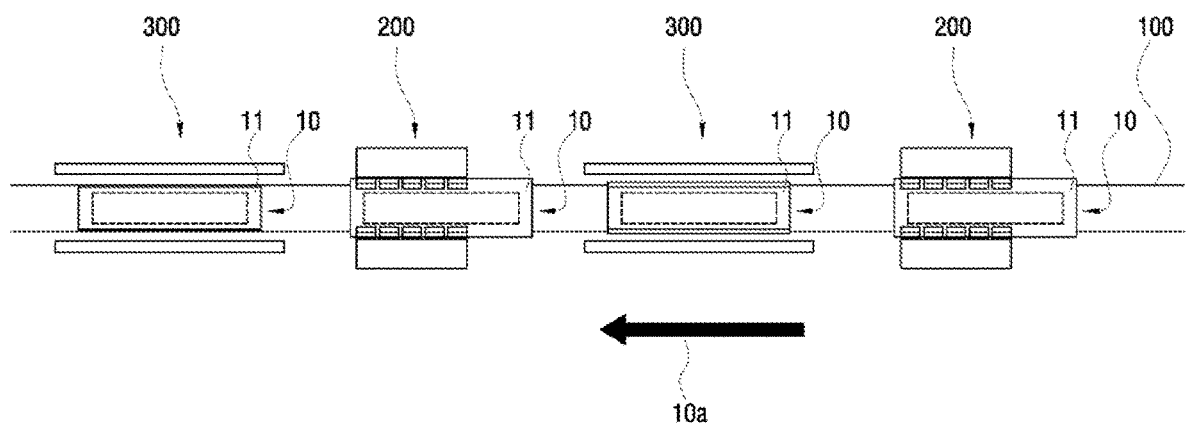
FIG. 1 is a view for explaining a terrace folding system of a secondary battery cell of the related art.
Figure 2:
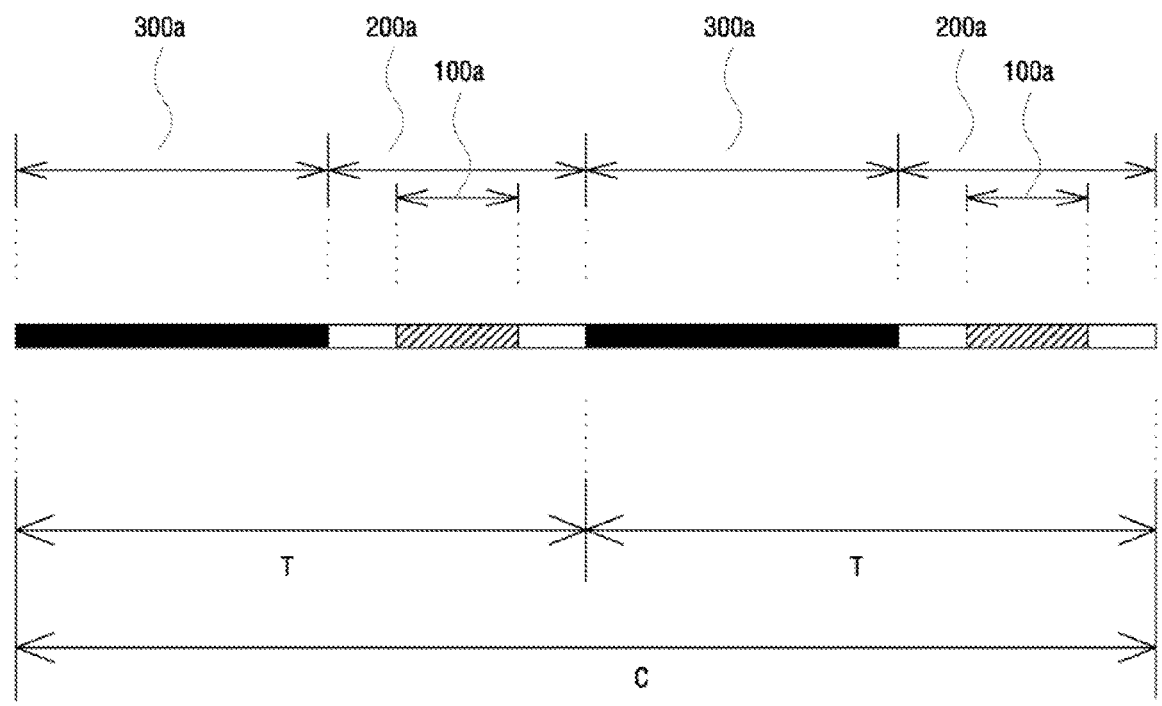
FIG. 2 is a view for explaining a tact time and a cycle time in a terrace folding system of a secondary battery cell of the related art of FIG. 1.

FIG. 1 is a view for explaining a terrace folding system of a secondary battery cell of the related art and FIG. 2 is a view for explaining a tact time and a cycle time in a terrace folding system of a secondary battery cell of the related art of FIG. 1.

Referring to FIG. 1, in a terrace folding system of a secondary battery cell of the related art, when the secondary battery cell 10 is transported by a transfer unit 100, a terrace 11 is formed by a folding roller 210.

According to a method of folding the terrace 11 using the folding roller 210, any one of the folding unit 200 or the secondary battery cell 10 moves along a length direction of the terrace 11 so that the terrace 11 is formed to have a shape of the folding roller included in the folding unit 200.

Referring to FIG. 1, in a terrace folding system of a secondary battery cell of the related art, when the secondary battery cell 10 is transported by the transfer unit 100, the folding unit 200 forms the terrace 11.

That is, when the folding unit 200 or a position of the folding roller including the folding unit 200 is fixed and the secondary battery cell 10 is transported by the transfer unit 100, the terrace 11 is formed.

Accordingly, the terrace folding system of the secondary battery cell of the related art does not require a separate moving unit to move the folding unit 200 along a length direction of the terrace 11.

Further, referring to FIG. 2, a time 100a taken to transport the secondary battery cell 10 and a time 200a taken to fold and form the terrace 11 overlap.

At this time, the time 100a that the secondary battery cell 10 is transported is unnecessarily increased so that the tact time and the cycle time are undesirably increased.

Generally, the longer the terrace folding time 200a of the secondary battery cell, the more stable formation is possible. In contrast, a shorter transport time 100a is more desirable.

As illustrated in FIG. 2, when the time 200a taken to fold and form the terrace is longer than the time 100a taken to transport the secondary battery cell 10, a time allocated to transport the secondary battery cell 10 is equal to the time 200a taken to fold and form the terrace.

That is, a time required to move the secondary battery cell 10 is dependent on the time 200a taken to fold and form the terrace 11.

Therefore, the tact time T is a sum of the time 200a taken to fold and form the terrace and an operating time 300a of a unit process unit 300 which performs other unit processes other than the folding unit 200.

Figure 3:
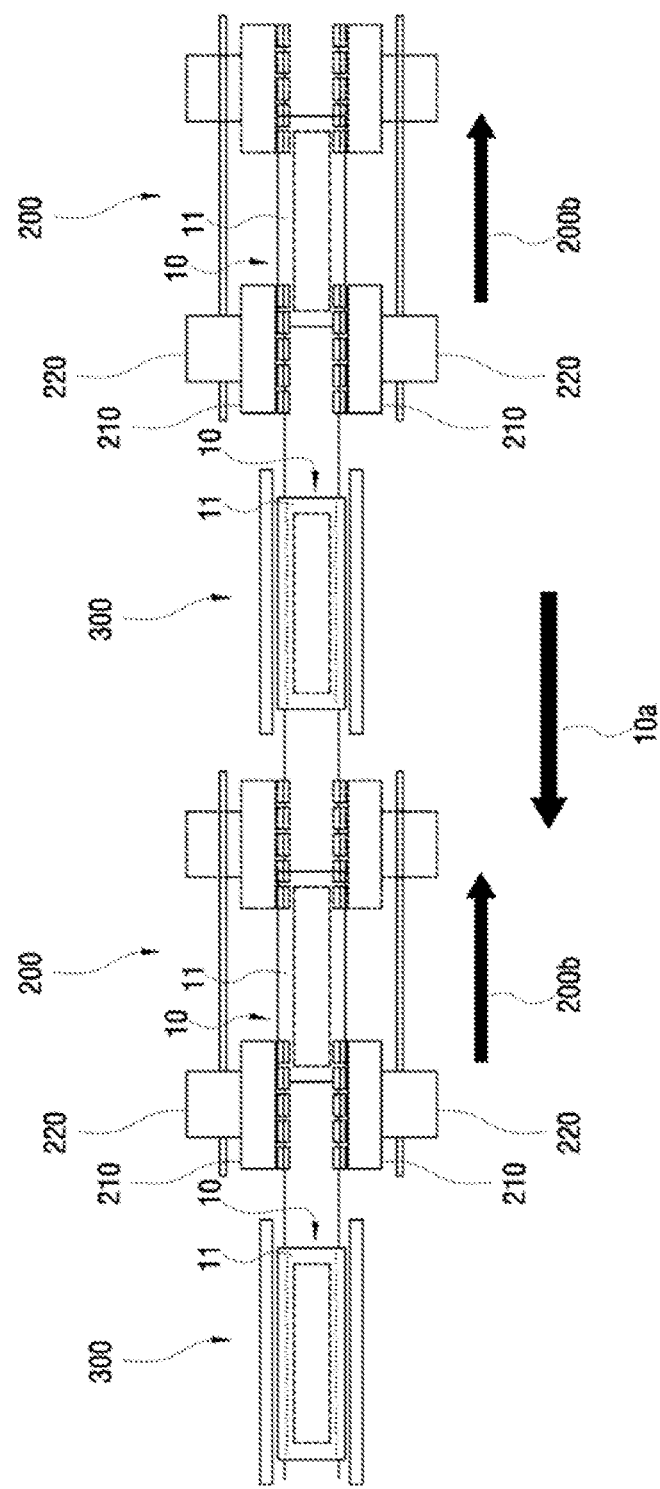
FIG. 3 is a view for explaining an exemplary embodiment of a terrace folding system of a secondary battery cell according to the present disclosure.
Figure 4:
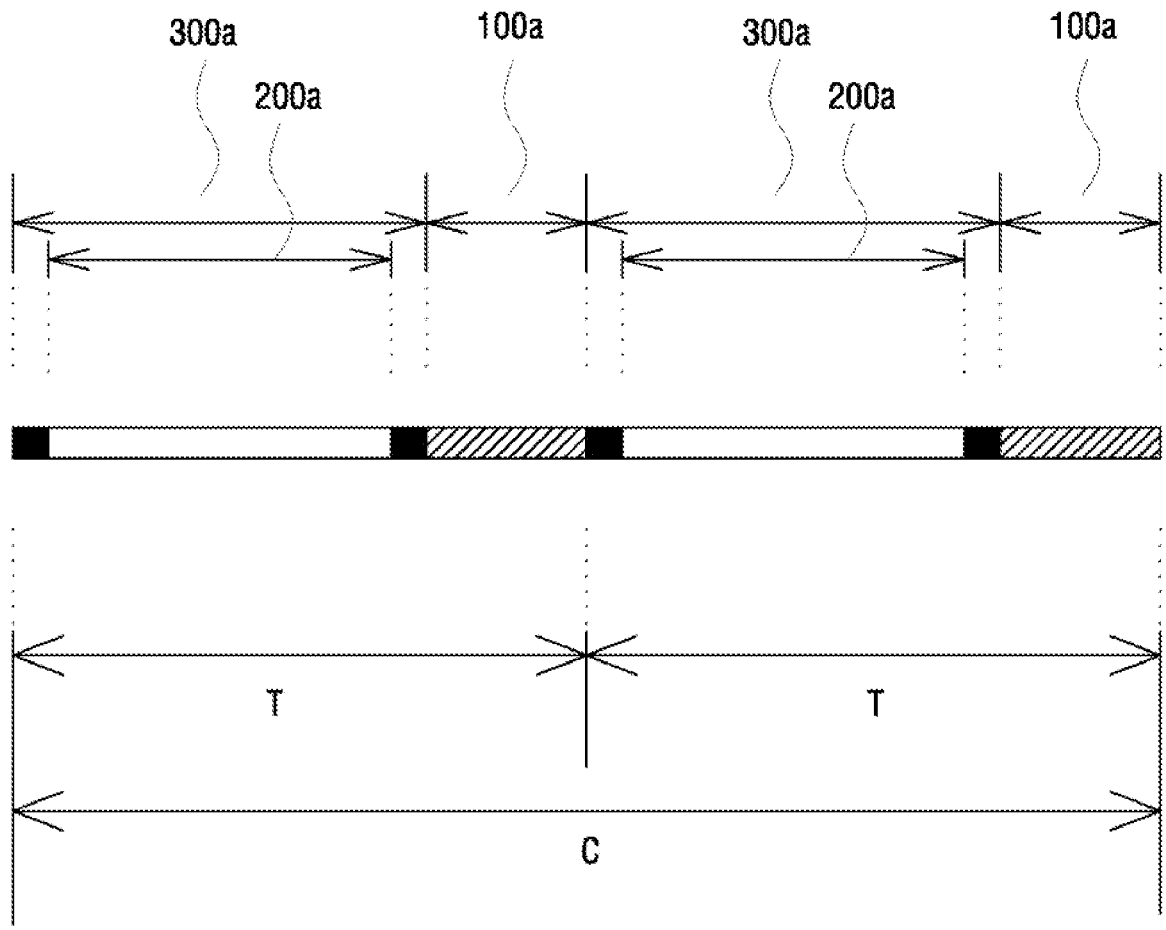
FIG. 4 is a view for explaining a tact time and a cycle time in a terrace folding system of a secondary battery cell according to the present disclosure of FIG. 2.

FIG. 3 is a view for explaining an exemplary embodiment of a terrace folding system of a secondary battery cell according to the present disclosure and FIG. 4 is a view for explaining a tact time and a cycle time in a terrace folding system of a secondary battery cell according to the present disclosure of FIG. 2.

Referring to FIGS. 3 and 4, a terrace folding system of a secondary battery cell according to the present exemplary embodiment includes a transfer unit 100 and a folding unit 200.

The transfer unit 100 transports the secondary battery cell 10.

The folding unit 200 is disposed along the transfer unit 100 and folds the terrace 11 of the secondary battery cell 10, but folds the terrace 11 of the secondary battery cell 10 to be temporally separated from the transfer unit 100.

Accordingly, the terrace folding system of the secondary battery cell of the present disclosure may minimize a time 100a that the transfer unit 100 transports the secondary battery cell 10.

As a result, the tact time and the cycle time may be reduced.

Further, the time 200a that the folding unit 200 folds the terrace 11 may extend in accordance with a time 300a that the unit process unit 300 which performs another secondary battery manufacturing unit process operates.

For example, when a time that the unit process unit 300 performs each process is longer than the time that the folding unit 200 folds the terrace 11, the terrace 11 folding time may be extended.

However, the secondary battery cell 10 may not be moved while the unit process unit 300 operates, so that the terrace folding time 200a may be extended.

In contrast, when the terrace (11) folding time 200a is extended, the folding is stably formed to reduce the failure.

In the terrace folding system of the secondary battery cell according to the present exemplary embodiment, the folding unit 200 may further include a folding roller 210 and a roller moving unit 220.

The folding roller 210 is in contact with the terrace 11 to form the terrace 11 at a specific angle.

The roller moving unit 220 moves the folding roller 210 along the length direction of the terrace 11 to any one direction.

At this time, a direction 200b in which the folding roller 210 moves may be the same as the direction 10a that the transfer unit 100 moves the secondary battery cell 10, or an opposite direction.

Further, the transfer unit 100 moves the secondary battery unit 10 from the unit process unit 300 to the folding unit 200 at a high speed and then stops the secondary battery cell 10.

The folding unit 200 forms the terrace 11 in the length direction while moving at a constant speed.

Further, in the terrace folding system of the secondary battery cell according to the present exemplary embodiment, the folding unit 200 may further include a sensing unit (not illustrated) and a movement controller (not illustrated).

The sensing unit (not illustrated) senses whether the operation of the transfer unit 100 ends.

When the sensing unit (not illustrated) senses that the operation of the transfer unit 100 ends, the movement controller (not illustrated) moves the roller moving unit 220 to one direction to fold the terrace 11.

In a state in which the transfer unit 100 operates, when the roller moving unit 220 starts the movement and then the operation of the transfer unit 100 ends, a speed at which the folding roller moves along the terrace 11 varies in the terrace of one second battery cell.

Therefore, the folding quality is not uniform so that the failure possibility may be increased.

Further, in the terrace folding system of the secondary battery cell according to the present embodiment, when the folding operation of the folding roller 210 to fold the terrace 11 ends, the movement controller (not illustrated) moves the roller moving unit 220 to the other direction.

Further, in the terrace folding system of the secondary battery cell according to the present embodiment, when the roller moving unit 220 moves to the other direction, the folding roller 210 is disposed at a folding beginning point of the terrace 11 of the secondary battery cell 10.

The folding beginning point may be both ends of the terrace 11 in a direction that the folding roller 210 moves.

Accordingly, as soon as the transportation of the secondary battery cell 10 by the transfer unit 100 ends, the terrace folding process by the folding unit 200 may be stably performed.

What is claimed is:

1. A terrace folding system of a secondary battery cell, the terrace folding system comprising:
    a transfer unit configured to transport the secondary battery cell; and
    a folding unit which is disposed and connectively mounted along the transfer unit, wherein the folding unit is temporally separated from the transfer unit to fold a terrace of the secondary battery cell,
    wherein the folding unit further includes:
    a folding roller which forms the terrace at a specific angle, and the folding roller configured to form the terrace of the secondary battery cell; and
    a roller moving unit which moves the folding roller to a direction along a length direction of the terrace of the secondary batter cell, and the moving unit configured to move.

2. The terrace folding system of claim 1, wherein the folding unit further includes a sending unit and a movement controller:
    the sensing unit configured to sense when an operation of the transfer unit ends; and
    the movement controller configured to move the roller moving unit to the one direction when operation of the transfer unit ends.

3. The terrace folding system of claim 2, wherein when a folding operation of the folding roller to fold the terrace ends, the movement controller moves the roller moving unit to other direction.

4. The terrace folding system of claim 3, wherein when the roller moving unit moves to other direction, the folding roller is disposed in a terrace folding beginning point of the secondary battery cell.

* * * * *